Aug. 31, 1937.  P. R. BASSETT ET AL  2,091,300
FLIGHT LEVEL CONTROL FOR AUTOMATIC PILOTS
Filed July 21, 1933  3 Sheets-Sheet 1

INVENTORS
PRESTON R. BASSETT
BERT G. CARLSON
BY
THEIR ATTORNEY.

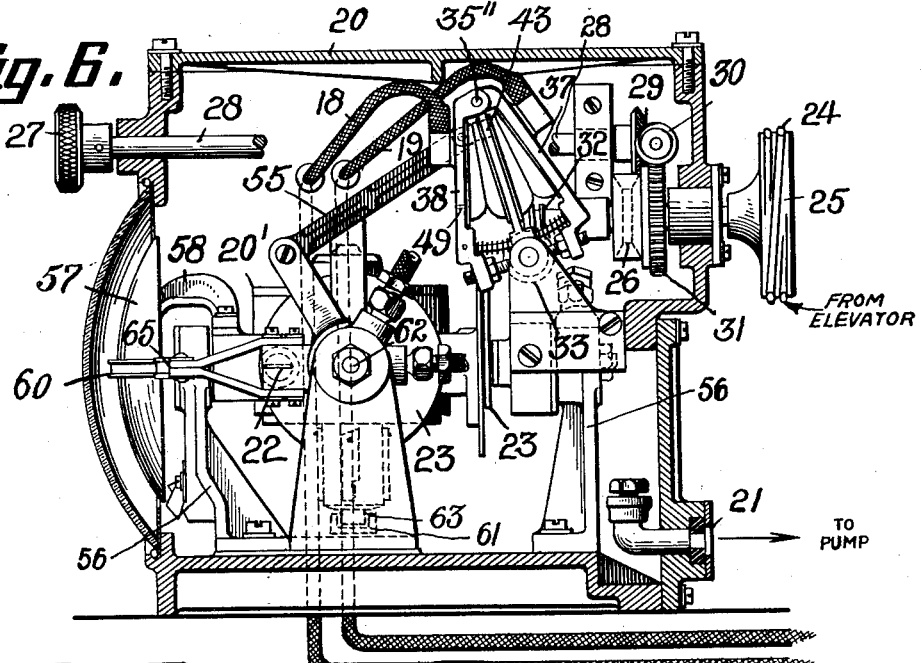
Fig. 6.
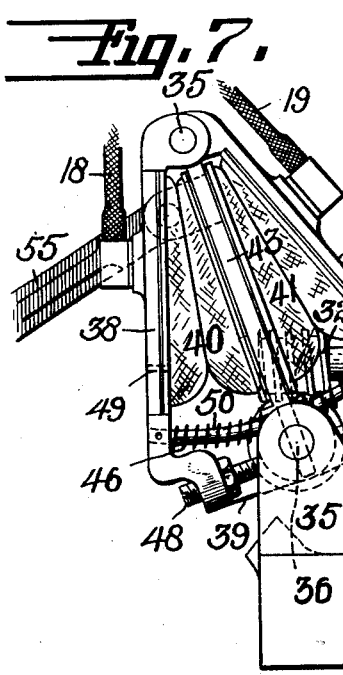
Fig. 7.
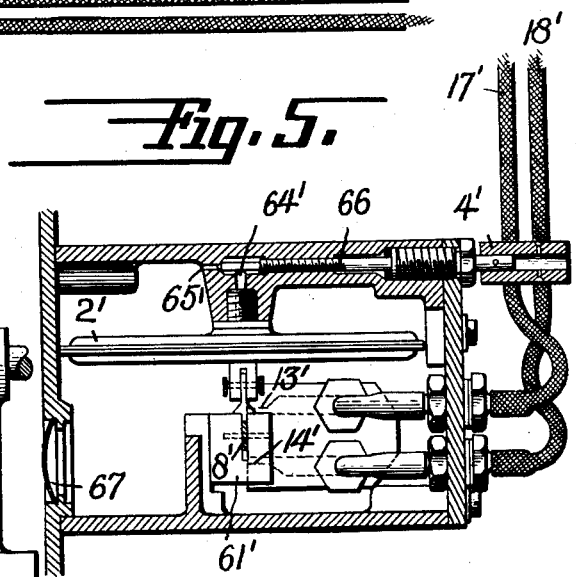
Fig. 5.
Fig. 12.
INVENTORS
PRESTON R. BASSETT &
BERT G. CARLSON
BY Herbert H. Thompson
THEIR ATTORNEY.

Aug. 31, 1937.  P. R. BASSETT ET AL  2,091,300
FLIGHT LEVEL CONTROL FOR AUTOMATIC PILOTS
Filed July 21, 1933    3 Sheets-Sheet 3
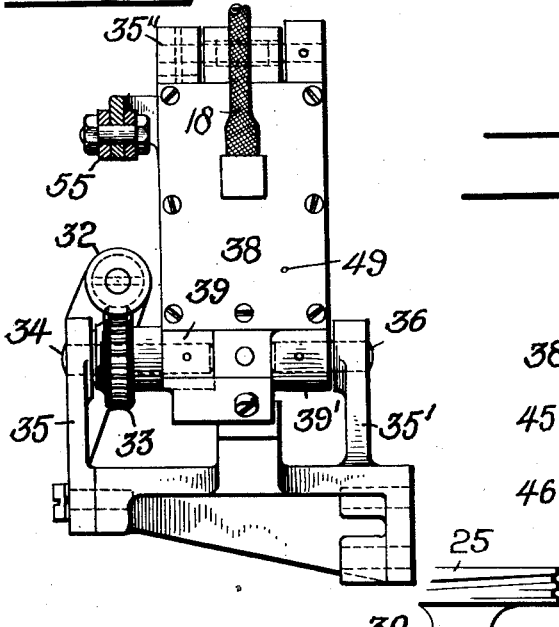
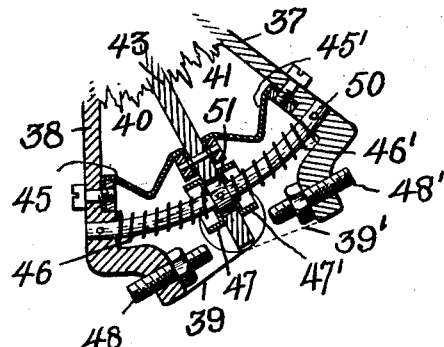
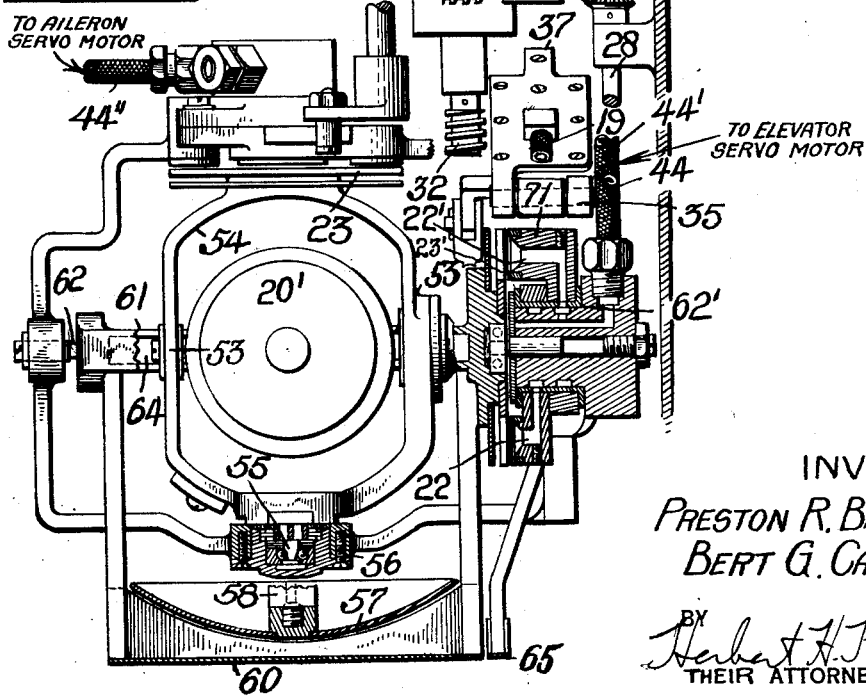
INVENTORS
PRESTON R. BASSETT
BERT G. CARLSON
BY Herbert H. Thompson
THEIR ATTORNEY.

Patented Aug. 31, 1937

2,091,300

UNITED STATES PATENT OFFICE 2,091,300

FLIGHT LEVEL CONTROL FOR AUTOMATIC PILOTS

Preston R. Bassett, Rockville Centre, and Bert G. Carlson, Queens Village, N. Y., assignors to Sperry Gyroscope Company, Inc., Brooklyn, N. Y., a corporation of New York Application July 21, 1933, Serial No. 681,424

11 Claims. (Cl. 244—78)

This invention relates to automatic or semi-automatic pilots for aircraft. Where a completely automatic control is provided, such as for an aerial torpedo which has no human pilot, it is, of course, necessary to provide a means for completely and automatically controlling the craft from the time it takes off until the time it lands. Therefore, such a device contains not only the usual elements of a so-called automatic pilot, such as now employed to assist the aviator in flying the ship by operation of the three controls from gyroscopes and/or other auxiliary apparatus for maintaining a straight course of the craft in azimuth and for maintaining it on a level flight both laterally and longitudinally, but also radio control means for altering the course and/or height from a distance and a barometer or height predetermining means for causing the aircraft to ascend when launched to the preset altitude and to fly at that height.

This invention relates primarily to improvements in the former type of instrument, that is, a device used only to assist or temporarily relieve the pilot in flying an airplane. While a directional gyroscope will maintain the craft on a substantially straight course with occasional resetting, it has been found that the gyro vertical or artificial horizon will not maintain uniformly level flight of the aircraft satisfactorily on account of the fact that rising and descending air currents may change the course of the craft in elevation without affecting its fore and aft level, that is, without affecting the gyro controls. Or, due to the loading of the craft, it may gradually climb or descend during flight. To assist the gyroscope in maintaining uniformly level flight, we propose to employ a device which may be brought into operation after the aircraft has reached the height at which it is desired to fly and which may be then set or used to maintain level flight at that altitude. Our device, therefore, resembles a statoscope and may operate through a differential link in the follow-up system leading to the gyroscope. Preferably novel differential air flow means are used to operate the variable link from the statoscope, which feature also has application to completely automatic flight as a link between the barometer and gyroscope.

Referring to the drawings showing several forms our invention may assume:

Fig. 5 is a horizontal section of the same.

Fig. 6 is a side elevation, partly in section, of the gyro vertical or artificial horizon with the controls thereon including the variable link operated from the statoscope.

Fig. 7 is an enlarged side elevation of the variable link or air bellows controlled from the statoscope.

Fig. 9 is an end elevation of the bellows.

Fig. 10 is a sectional detail of the same.

Fig. 11 is a plan view, partly in section, of the gyro-vertical.

Fig. 12 is a partial face view of the artificial horizon.

Figure 1:
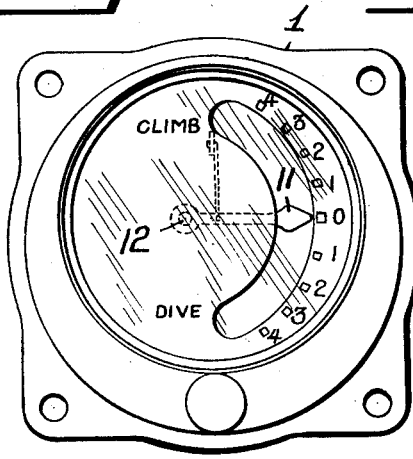
Fig. 1 is a front view of the face of the statoscope.
Figure 2:
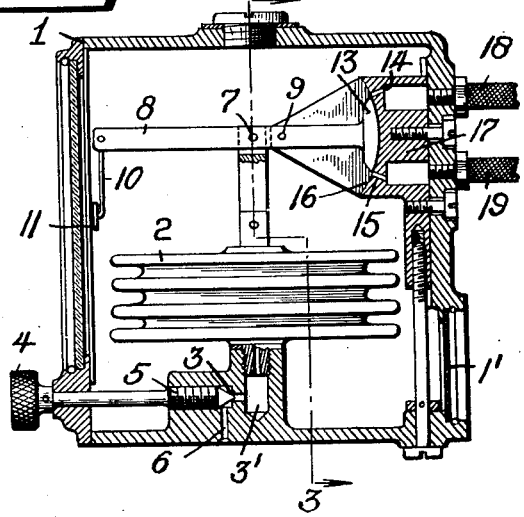
Fig. 2 is a vertical section of the same.
Figure 3:
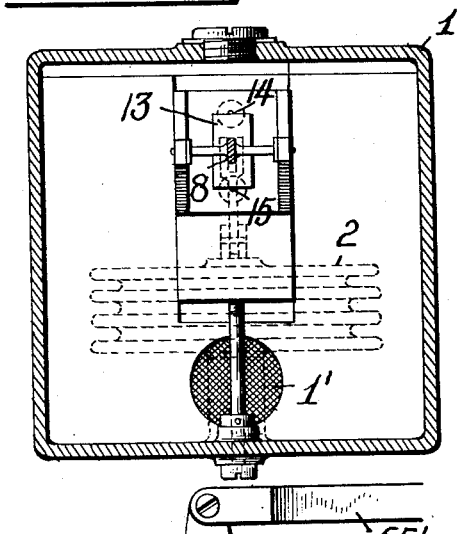
Fig. 3 is a horizontal section of the same on line 3—3 of Fig. 2 the expansible container, however, being shown in dotted lines.

In the form shown in Figs. 1 to 3, the statoscope comprises a casing 1 open to the atmosphere through screened opening 1', within which is mounted an expansible container 2. The interior of said container is connected at the bottom to chamber 3', the outlet of which is provided with a needle valve 3. Said valve is normally left open but may be closed either partially or entirely at the will of the operator by screwing in on the thumb piece 4, the stem 5 of which is threaded into the case and which shuts off communication with the outer air through the channel 6. The flexible container is connected at its upper side through pin 7 to a lever 8 hinged at 9. Said lever may have suspended from one end a link 10 connected to a pointer 11 pivoted at 12. When valve 3 is open, the pointer normally reads zero, that is, is centralized. If, however, the valve is closed and the airplane does not maintain the altitude at which the valve is closed, the air in the container will raise or lower the same according as the plane is ascending or descending and, therefore, the pointer 11 will be displaced to show that the plane is climbing or diving and its approximate amount of ascend or descend. The main function of our statoscope, however, is to operate the controls in such a manner as to prevent any substantial climb or dive and to maintain approximately the original level of the craft. To this end we have shown the right hand end of the lever 8 as provided with a rounded head 13 which does not touch, but the upper and lower edges of which normally partially overlie slots 14 and 15 in a concave surface 16 in a member 17 secured inside of the casing. Preferably the shutter 13 is placed at a greater distance from the pivot point 9 than the point of connection 7 from the flexible container 2 to the lever 8 in order to multiply the movements of the diaphragm at the shutter and give more accurate control. Likewise the movements of the pointer 11 will be magnified for the same reason. Said slots communicate respectively with pipes 18 and 19 leading to the differential link arrangement within the air tight casing 20 containing the gyro vertical 20' or artificial horizon. Said gyroscope and the controls therefrom may be of substantially the same form as disclosed in the copending application of Elmer A. Sperry, Jr., Mortimer F. Bates, and Bert G. Carlson, one of joint applicants, now matured into Patent No. 1,992,970, dated March 5, 1935.

The gyroscope which is preferably air spun is shown as mounted on transverse horizontal trunnions 53 in gimbal ring 54 which in turn is pivoted about fore and aft axis 55 on brackets 56 in casing 20. Preferably the gyroscope is also used as an indicator of the horizon or artificial horizon. For this purpose a concave disc 57 is connected to gimbal 54 by bracket 58 to show lateral tilt by graduations 59 and a horizontal bar 60 is secured to a bail or loop 61 pivoted on trunnions 62, 62' and slidably connected to the gyroscope through a pin 63 depending therefrom and engaging a trackway 64 in the bail. By connecting the reference index 65 for the pitch bar 60 to the pivotally mounted member 71 containing the air ports 22, 22', the aviator is furnished with a means for showing a change in level of the craft even though not detected by the gyroscope.

According to this system, air is continually extracted from the casing through opening 21 by means of a pump. On the other hand air at atmospheric pressure enters the casing through control ports 22, 22' and similar ports (not shown) at right angles thereto on the fore and aft axis of the gyroscope by means of which the servomotors are controlled by the differential air pressure created by cut off discs 23 and 23' secured to the gyroscope and to bail 61, respectively as explained in said prior patent. For introducing a follow-up from the servomotor, the ports are preferably provided in members 71, one of which is rotatably mounted on a trunnion 62' of bail 61 in line with the trunnion axis 53 of the gyroscope. Pipes 44 and 44' are connected with ports through the trunnion respectively to the ports 22 and 22', said pipes running to the servomotor (not shown).

We prefer to introduce our statoscope control as a variable link in the follow-up system. As shown, the follow-up from the elevator servomotor may be effected through flexible cable 24 turning the pulley 25, which in turn rotates one arm of the differential gear train 26. The other arm may be turned from setting knob 27 through shaft 28, bevel gears 29 and worm 30 and wormwheel 31, by means of which the craft may be caused to climb or dive at will. The third arm of said train turns the worm 32 which rotates the small wormwheel 33 (Fig. 9). Said wormwheel is mounted on a stub shaft 34 journaled in bracket 35. A complementary stub shaft 36 is journaled in an opposite bracket 35'. An irregular shaped plate 38 is shown as secured to the stub shaft 34 while a complementary plate 37 is correspondingly secured to the stub shaft 36 by means of lugs 39 and 39' extending toward each other from the base of said members. Said plates form the outer walls of a pair of bellows 40 and 41 and are hinged at their top by means of a common pin 35" journaled in a central plate 43 forming the common central or dividing wall between said two bellows. Adjacent its bottom, said plate 43 has secured thereto the flexible walls 45, 45'. Extending through a hole in said plate is a curved rod 50 having its ends pinned to 37 and 38 and having a central collar 51 pinned thereto. Mounted on said rod are a pair of opposing compression springs 46, 46' which bear at the outer ends respectively against said plate 37 and 38 and at their inner ends against loose collars 47, 47' which rest against plate 43. Limit set screws 48, 48' may be provided in the base of members 37, 38 to limit the movement of the plate 43 between the same. Each bellows is also provided with a small leak 49, 49' and is also connected through pipes 18 and 19 respectively to the statoscope ports. Since air is continuously exhausted from the casing 20, air will also be slowly withdrawn from each bellows so that they are below atmospheric pressure. However, the interior of each bellows is connected to the atmosphere through the pipes 18 and 19 and ports 14 and 15 so that air will flow into said bellows at an equal rate if the two ports 14 and 15 are open the same amount thus maintaining them partially and equally expanded. In case, however, one port becomes closed more than another, the air pressure will become greater in one container than the other. Since plates 37 and 38 are anchored to rod 50 and also at 35", center plate 43 will be rotated about pin 35" an amount proportional to the difference in air pressure in the two bellows, thereby moving connecting link 55' to rotate the air ports 22, 22'. At the same time the regular follow-up connection is not interfered with because rotation of wormwheel 33 will rotate bodily the entire bellows with shafts 34 and 36.

Figure 4:
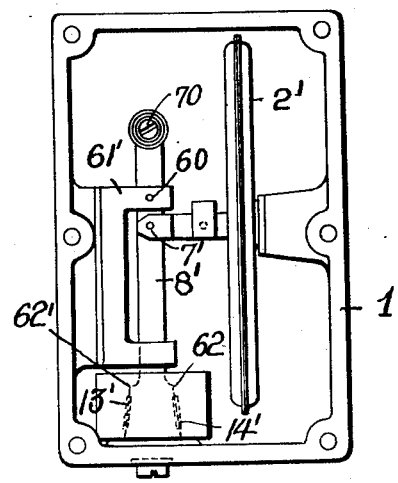
Fig. 4 is a side view with the cover removed of a modified form of statoscope.
Figure 8:
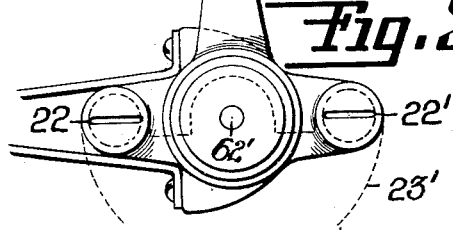
Fig. 8 is a detail showing how the link is connected to the controls of the gyroscope.

The preferred construction for our statoscope is shown in Figs. 4 and 5. According to this construction the flexible air container 2' is linked at one side at 7' to a blade 8' pivoted at 60 to bracket 61'. Said blade may be slightly enlarged at its lower end, the opposite edges 62, 62' partially overlying ports 13', 14' corresponding in function to the ports 13, 14 of Fig. 2, said ports being connected respectively through pipes 17' and 18' to the bellows as before. In this case the blade or shutter is counter-balanced by a mass 70 on the blade above the pivot 60. In this case the interior of the bellows is connected through passage ways 64' and 65' to the interior of the case 1', the latter passage being opened and closed by means of the threaded stem 66 rotated by thumb piece 4' as before. While air is normally withdrawn from the casing through ports 13' and 14', the rate of withdrawal is slow compared to the size of the opening 67 therein so that the air within the casing is at atmospheric pressure.

From the foregoing the operation of our invention will be readily understood. In launching and until the plane has reached its desired altitude, the valve 4 or 4' is preferably left open so that the statoscope does not interfere with the controls either through the gyroscope or by hand. When it is desired to maintain level flight, the valve 3 is closed so that in case the airplane changes its level in spite of the gyroscope, the position of the control ports at the gyroscope will be changed through the expansion or contraction of the bellows controlled from the statoscope to maintain level flight. It is obvious that the valve 3 need not be entirely closed, if desired, thereby providing a restricted opening, and left in that position. In such case, the device will still operate quite satisfactorily to maintain level flight, since it will be responsive to any comparatively sudden change in altitude and act to prevent the same.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In an automatic pilot for aircraft, dual means for maintaining level flight comprising a gyro-vertical and an expansible normally centralized container normally open to the atmosphere, means for closing the same at will, and means brought into action by expansion or contraction of said container after closing, due to ascent or descent of the craft for altering the relation between the gyro-vertical and craft to maintain level flight.

2. In an automatic pilot for aircraft, means for maintaining a horizontal reference plane, control means responsive to change of relative inclination of said means and craft, a differential air bellows, means for slowly withdrawing air therefrom, a pair of ports connected to said bellows and open to the atmosphere, and means controlled by changes in atmospheric pressure in either direction for oppositely closing said ports to cause unequal expansion of the bellows and means connecting said bellows and said control means to change the relation of said means to the craft.

3. In a pneumatic automatic pilot for aircraft, the combination with a gyroscope pivoted about fore and aft and lateral axes, a closed casing therefor, means for continuously withdrawing air therefrom, two pairs of air ports about both of said axes connected to the atmosphere and adapted to be differentially closed by inclination of the aircraft about either axis, servomotors for the elevators and ailerons controlled by the differential pressure created by the variable air flow through said ports, a third pair of ports also connected to the atmosphere, a statoscopic device for differentially opening and closing the same, and pressure responsive means also in said closed casing and connected to said ports for turning one of said first named pair of ports.

4. In a pneumatic automatic pilot for aircraft, the combination with a gyroscope pivoted about fore and aft and lateral axes, a closed casing therefor, means for continuously withdrawing air therefrom, a pair of airports about the lateral axis of said gyroscope and connected to the atmosphere and adapted to be differentially closed by inclination with respect to said gyroscope, a differential bellows device also in said casing for changing the inclination of said ports, said bellows have slow leaks in each part thereof to the interior of said casing, a device responsive to changes in atmospheric pressure, a pair of ports adapted to be differentially closed thereby upon changes in such pressure, and connections from said ports to each part of said bellows device whereby the one part will receive air faster then the other and expand and rotate said first mentioned air ports when the atmospheric pressure changes.

5. A pneumatic automatic pilot for aircraft as claimed in claim 4 wherein the differential bellows device is introduced as a variable link in the follow-up connections from the elevator servomotor to the air ports at the gyroscope.

6. In an automatic pilot for aircraft, dual means for maintaining level flight comprising an artificial horizon and an expansible normally centralized container normally open to the atmosphere, means for closing the same at will, a control device for actuating the elevator responsive to relative inclination of said craft and horizon, and means brought into action by expansion or contraction of said container after closing, due to ascent or descent of the craft for altering the relation between said horizon, said device and craft to maintain level flight.

7. In an automatic pilot for aircraft, an artificial horizon for controlling the craft, a horizon bar, means connected therewith to cause it to simulate the apparent movements of the real horizon on pitching of the craft, a movable reference member therefor, a statoscopic device, means operated therefrom for operating through the gyroscope for maintaining level flight, and means connecting said device and member whereby the apparent movements of said bar also simulate the real horizon when descending or rising without pitch.

8. In an automatic pilot for aircraft having a gyroscopic artificial horizon for controlling the same, an attitude indicator connected with said horizon comprising a pair of indicating members relatively movable up and down, means connecting said artificial horizon and an indicating member to cause up and down movement thereof on pitching of the craft, means responsive to rapid variations in atmospheric pressure, means operated therefrom for operating through said horizon for maintaining level flight, and means connecting said pressure responsive means and an indicating member to cause up and down movement thereof on change of altitude of the craft.

9. In a control device for aircraft, the combination with an artificial horizon for controlling the elevator, of a flexible container at least partially closed to the atmosphere, a shutter connected to the movable side of said container so as to be moved as said container expands and contracts, an air port on each side of said shutter but out of contact therewith, a pair of differential air pressure means, one connected to each port, means for slowly and equally withdrawing air from each, and means operated by said pressure means for altering the controls at the horizon from which the position of the elevator is controlled.

10. In a device for controlling aircraft in elevation, an outer casing, a barometric device of the aneroid type within said casing and having a flexible diaphragm, a shutter pivoted within said casing and connected to said diaphragm so as to be rotated about said pivot as the diaphragm expands and contracts, an air port on each side of said shutter but out of contact therewith, said air port being located at a greater distance from said pivot than the point of connection from said diaphragm to said shutter, differential air pressure means connected to said ports and leading without said casing, means for normally equally withdrawing air from each without altering substantially the atmospheric pressure to which said container is exposed, and means operated by pressure differential caused by unequal opening and closing of said ports due to movement of said shutter for altering the aircraft control in elevation.

11. In a device for controlling aircraft in elevation, an outer casing, a flexible container mounted within said casing having a restricted opening to atmospheric pressure, a shutter pivoted within said casing and connected to the movable side of said container so as to move as said container expands and contracts, an air port within said casing on each side of said shutter but out of contact therewith, a pair of differential air pressure means, one connected to each port and leading without said casing, means for normally equally withdrawing air from each port without altering substantially the atmospheric pressure to which said container is exposed, and means operated by said pressure means for altering the aircraft elevation controls.

PRESTON R. BASSETT.
BERT G. CARLSON.